(12) United States Patent
Matsuda et al.

(10) Patent No.: US 8,265,892 B2
(45) Date of Patent: Sep. 11, 2012

(54) MANUFACTURING PRODUCTS MANAGEMENT METHOD, SYSTEM AND APPARATUS

(75) Inventors: Noriyuki Matsuda, Ebina (JP); Masayasu Takano, Ebina (JP); Akiko Seta, Ebina (JP); Koji Adachi, Ashigarakami-gun (JP); Kaoru Yasukawa, Ashigarakami-gun (JP); Tetsuichi Satonaga, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 463 days.

(21) Appl. No.: 12/537,630

(22) Filed: Aug. 7, 2009

(65) Prior Publication Data

US 2010/0198541 A1 Aug. 5, 2010

(30) Foreign Application Priority Data

Feb. 2, 2009 (JP) .................................. 2009-021586

(51) Int. Cl.
 *G01N 37/00* (2006.01)
(52) U.S. Cl. ........................... 702/82; 702/117; 702/182
(58) Field of Classification Search .................... 702/82, 702/117, 182; 700/1, 9, 28, 90; 705/500
See application file for complete search history.

(56) References Cited

U.S. PATENT DOCUMENTS

| 6,115,034 A | * | 9/2000 | Tanaka et al. | 715/700 |
| 7,707,085 B2 | * | 4/2010 | Sakurai et al. | 705/35 |
| 7,912,806 B2 | * | 3/2011 | Yanagi et al. | 706/50 |
| 2008/0071490 A1 | * | 3/2008 | Nakamura | 702/82 |

FOREIGN PATENT DOCUMENTS

JP 10-027043 A 1/1998

\* cited by examiner

*Primary Examiner* — Michael Nghiem
*Assistant Examiner* — Elias Desta
(74) *Attorney, Agent, or Firm* — Sughrue Mion, PLLC

(57) ABSTRACT

A management apparatus includes: a managing unit that manages production information corresponding to each of a plurality of information processing devices; a specifying unit that specifies, based on a defect notice for at least one component and the production information on the managed information processing devices, at least one of the information processing devices using the component; a state judging unit that judges whether each information processing device is in an operable state where a processing function of each information processing device is operable in an environment in which the processing function of each information processing device is provided; and an operation restricting unit that performs operation restriction for the processing function of each information processing device according to the defect notice if the state judging unit judges that each information processing device is in the operable state.

11 Claims, 9 Drawing Sheets

| DEVICE ID | INSTALLATION AREA | PERSON IN CHARGE | IP ADDRESS |
|---|---|---|---|
| machine001 | FIRST AREA | PERSON A | 10.254.1.1 |
| machine002 | SECOND AREA | PERSON B | 20.180.3.1 |
| ... | ... | ... | ... |
| machine020 | TENTH AREA | PERSON A | 10.50.180.2 |
| machine021 | - AREA | PERSON K | 11.60.10.1 |
| | | | |

| MEASURE ID 701 | DEFECT DETAILS 702 703 | | MEASURE DETAILS 704 | IMPORTANCE 705 |
|---|---|---|---|---|
| | TARGET SITE | DEFECT STATE | | |
| 0001 | PART A | TROUBLE INCORPORATION | SUSPEND FUNCTION a | A |
| 0002 | PART B | FAILURE | STOP ALL FUNCTIONS | A |
| ... | ... | ... | ... | ... |

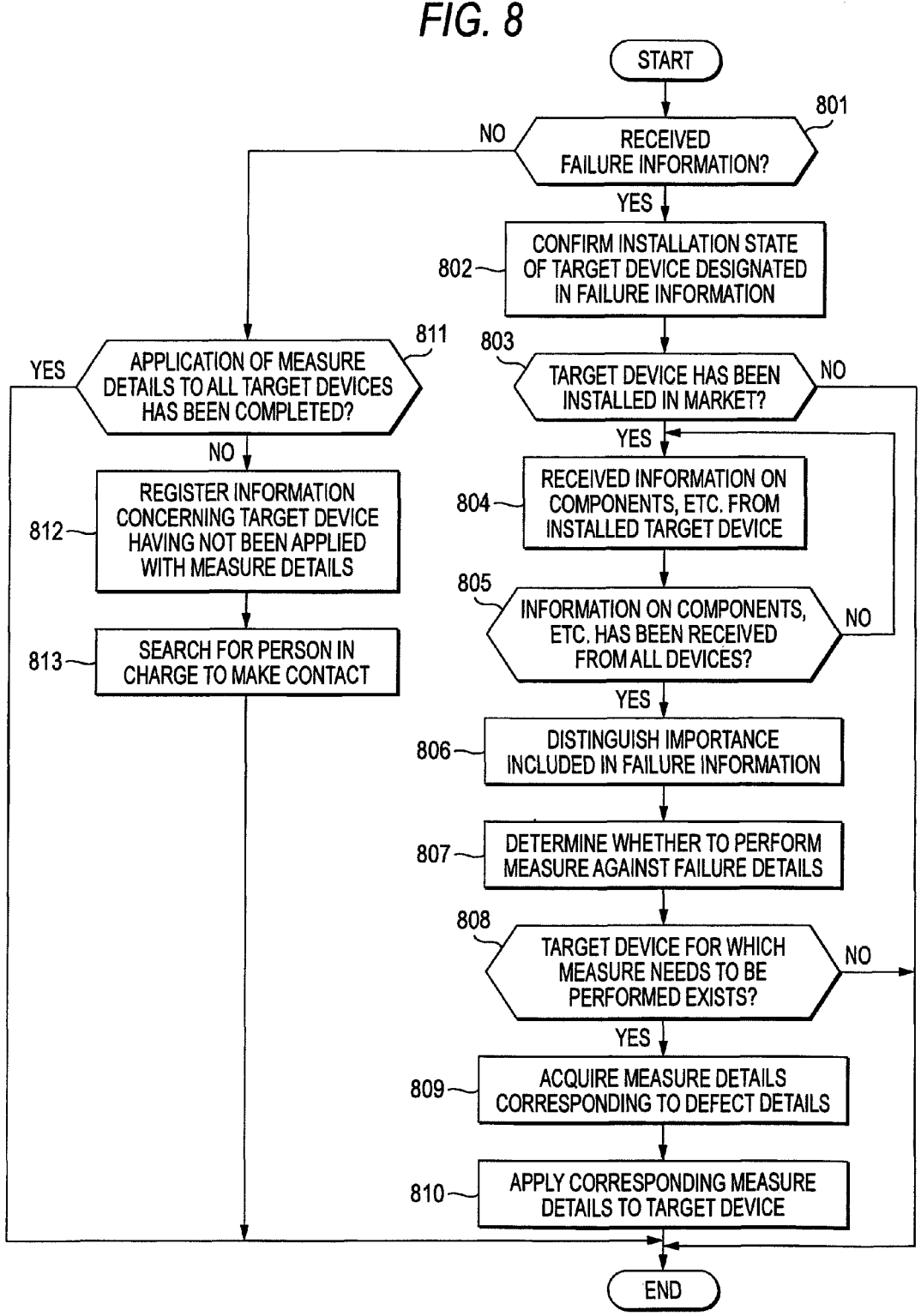

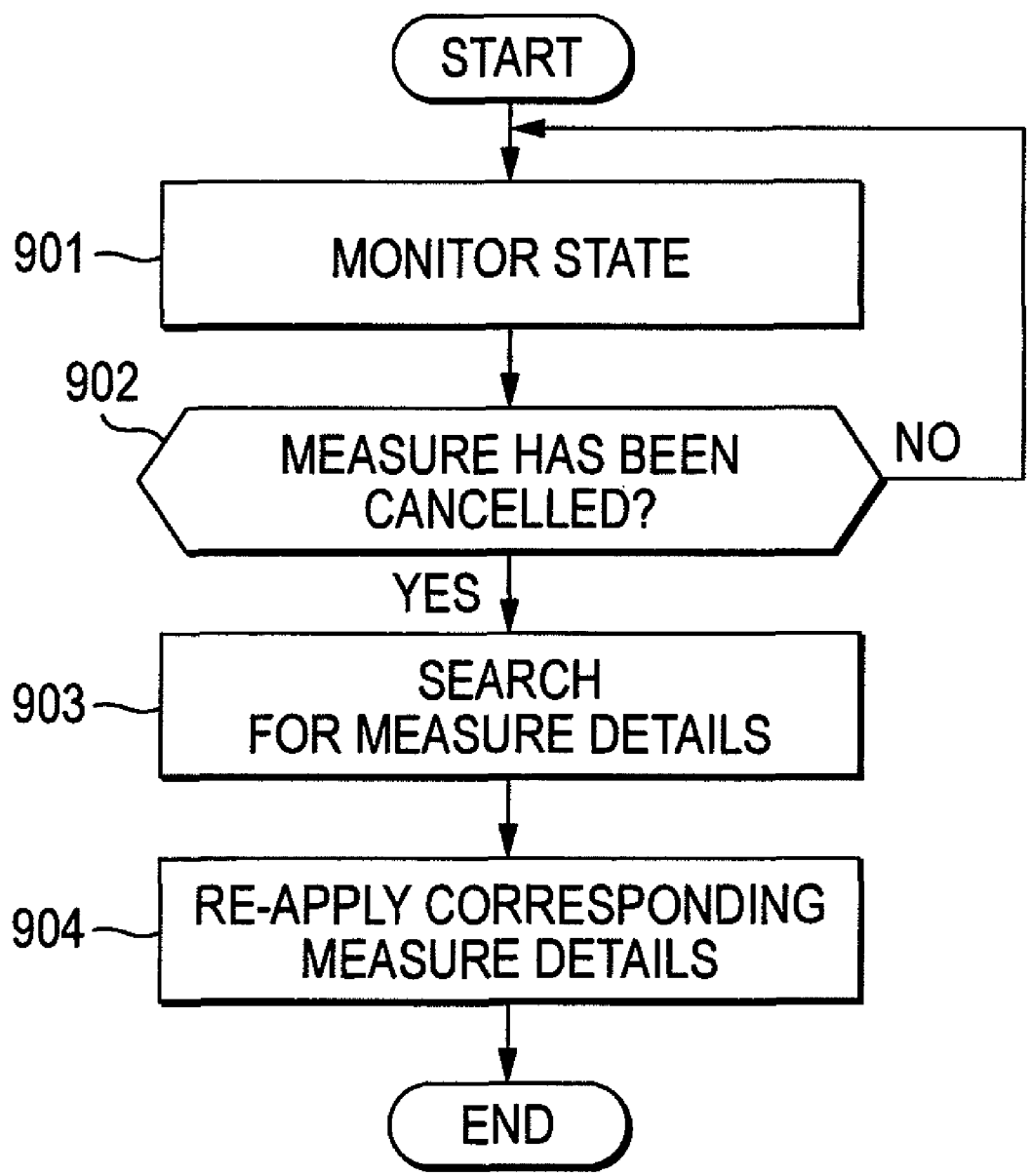

MANUFACTURING PRODUCTS MANAGEMENT METHOD, SYSTEM AND APPARATUS

CROSS-REFERENCE TO RELATED APPLICATION

This application is based on and claims priority under 35 USC 119 from Japanese Patent Application No. 2009-021586 filed Feb. 2, 2009.

BACKGROUND

1. Technical Field

The present invention relates to a management apparatus, a management system, a management method and a computer readable medium.

2. Related Art

In bases and processes for manufacturing products such as devices, the quality of the manufactured devices has been confirmed and managed to thereby prevent defective devices from being distributed to market. There is a case where defect occurs only to one or a few devices as well as a case where the defect occurs in all devices manufactured on a predetermined production line on a specific production date.

When certain defect is found after delivering products and the defect occurs in many products as in the latter case, a prompt investigation into the cause and an early improvement may be required.

Usually, an operator called a customer engineer or the like visits the sites where the devices are installed for repair work.

SUMMARY

According to an aspect of the invention, a management apparatus includes a managing unit, a specifying unit, a state judging unit and an operation restricting unit. The managing unit manages production information corresponding to each of a plurality of information processing devices. The specifying unit specifies, based on a defect notice for at least one component and the production information on the information processing devices managed by the managing unit, at least one of the information processing devices using the at least one component. The state judging unit judges whether each of the at least one of the information processing devices is in an operable state where a processing function of each of the at least one of the information processing devices is operable in an environment in which the processing function of each of the at least one of the information proceeding devices is provided. The operation restricting unit performs operation restriction for the processing function of each of the at least one of the information proceeding devices according to the defect notice if the state judging unit judges that each of the at least one of information processing devices is in the operable state.

BRIEF DESCRIPTION OF THE DRAWINGS

Exemplary embodiments of the invention will be described in detail based on the following figures, wherein:

FIG. 7 is a table showing an example of measure information;

FIG. 8 is a flowchart showing a detailed flow of processing in the market management server of the management system in the embodiment of the present invention; and FIG. 9 is a flowchart showing a detailed flow of processing in the market management server of the management system in the embodiment of the present invention.

DETAILED DESCRIPTION

Figure 1:
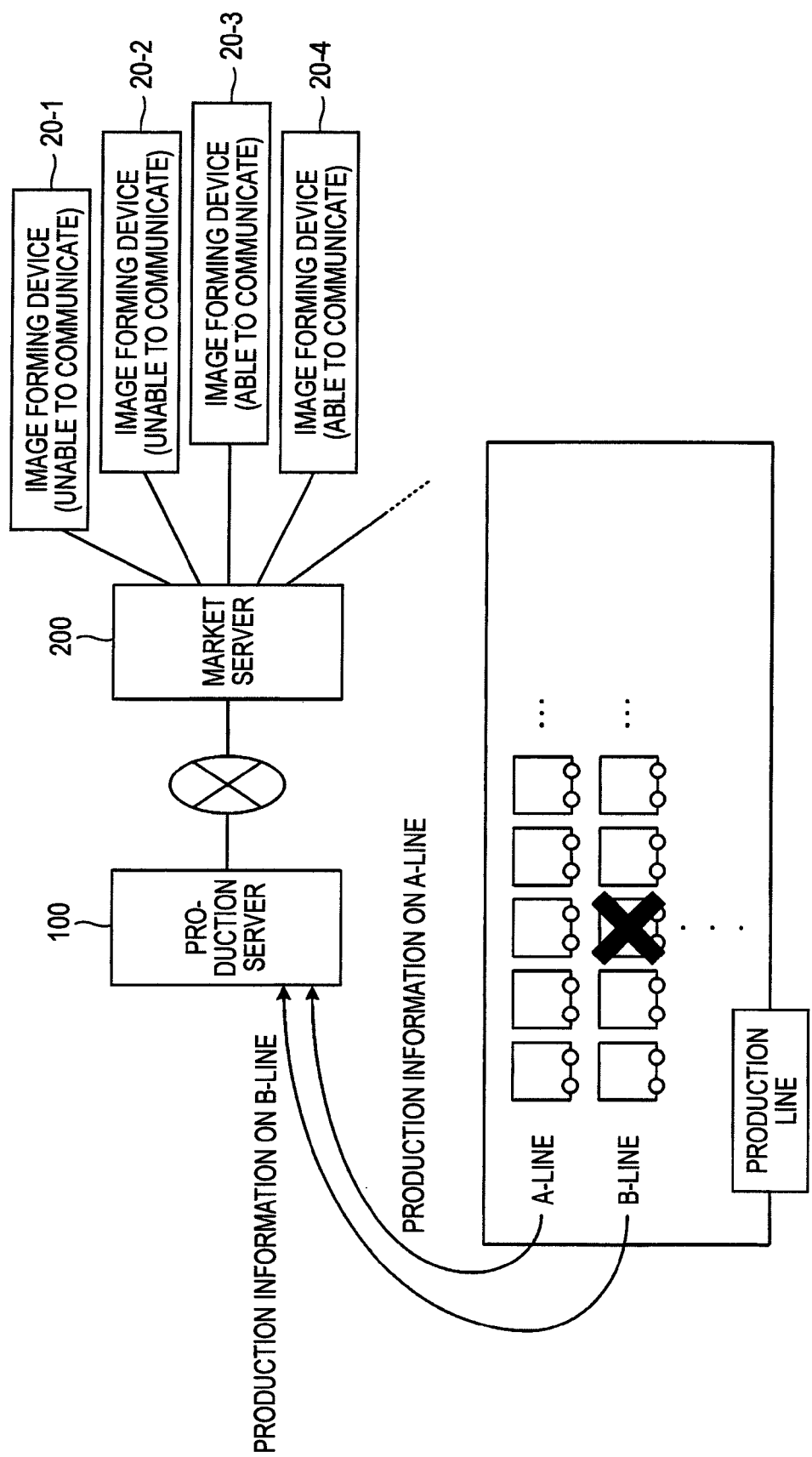
FIG. 1 is an example of a system configuration diagram of a management system configured with the management apparatus, the management system, and the management program in the embodiment of the present invention applied.

FIG. 1 is an example of a system configuration diagram of a management system configured with the management apparatus, the management system, and the management program in the embodiment of the present invention applied.

In FIG. 1, the management system includes a production server 100, a market management server 200, and image forming devices (20-1, 20-2, . . . (hereinafter, generally referred to as "an image forming device 20")) being examples of information processing devices.

The production server 100 has registered production information concerning image forming devices manufactured on production lines of a factory that manufactures the image forming device 20, for each of the product lines. The example shown in FIG. 1 shows a plurality of production lines "A-line," "B-line," . . . , and in this case, the production server 100 stores the production information in the form of production information on image forming devices produced on A-line on a production date and production information on image forming devices produced on B-line on a production date.

The production information includes identification information (hereinafter, also referred to as "device IDs") to identify the manufactured image forming devices, the production date, the production line, information on various components used, and information on a person in charge of production or the like.

Further, the production server 100 receives a defect notice including information such as the production date and production line of a component where a defect may occur, the details of a defect that may occur, and the importance of a measure against the defect details.

The production server 100 that has received the defect notice specifies an image forming device for which a measure such as an operation restriction is necessary on the basis of the defect notice based on the production information, and acquires identification information to identify the image forming device. The production server 100 then prepares defect information including the acquired identification information and the defect and importance notified in the defect notice.

The importance of this time is information for determining a measure such as an operation restriction to be performed based on a defect. When a high degree of importance is set, a measure of stopping all functions of the image forming device is performed, for example, while when a low degree of importance is set, an operation restriction is performed by a measure of displaying a message to indicate calling attention on a display screen that is performed for the image forming device, for example.

The production server 100 that has prepared such defect information transmits the defect information to the market management server 200.

The market management server 200, which is connected with the production server 100 via an electrical communication line, is an example of a management apparatus that manages the image forming device 20 set on the market (field) being in a state where an image forming processing function of the image forming device is operable in an environment where the image forming processing function is provided through a sale or the like.

The market management server 200, when having received defect information from the production server 100, analyzes the defect information, and judges whether to apply a measure against the defect. At this time, it is judged whether to apply, to the image forming device designated in the defect information, a processing based on the importance included in the defect information.

Examples of this measure (operation restriction) include a measure of displaying arbitrary information on the display screen of the image forming device and a measure of performing a change etc., in a set value set for a setting item of the image forming device, besides a measure of stopping all functions of the image forming device and a measure of stopping some processing functions of the image forming device.

When the measure is applied as such, defect information and repair or replacement concerning a defect indicated by the defect information are requested for a person appointed to take charge of the image forming device applied with the measurement.

Figure 2:
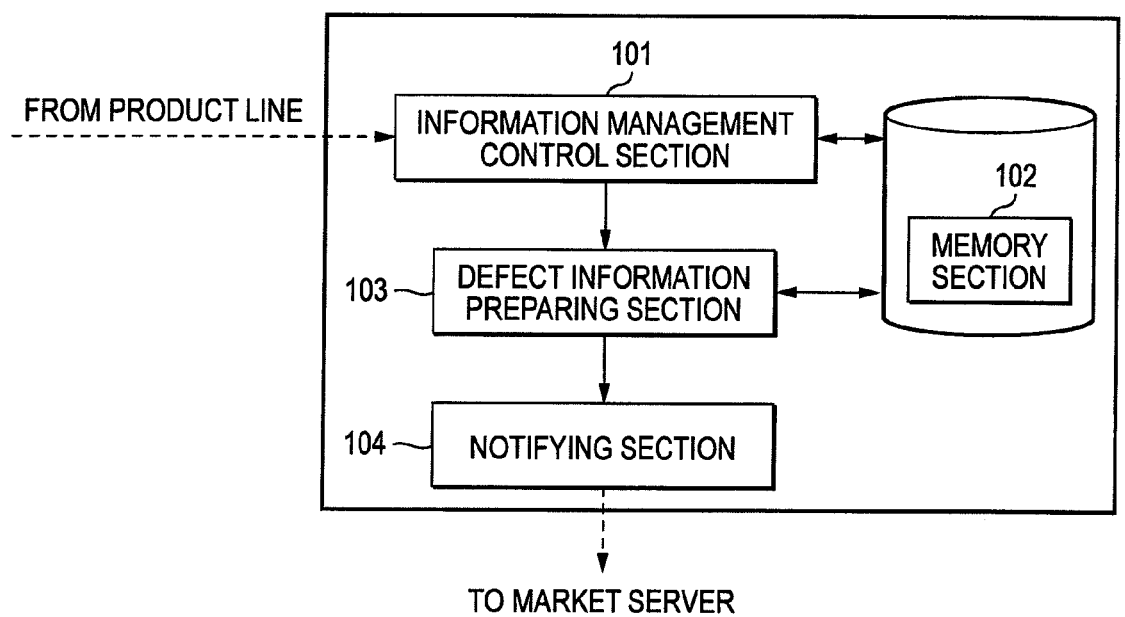
FIG. 2 is a diagram showing a detailed configuration of the production server of the management system in the embodiment of the present invention.

FIG. 2 is a diagram showing a detailed configuration of the production server 100 of the management system in the embodiment of the present invention.

In FIG. 2, the production server 100 includes an information management control section 101, a memory section 102, a defect information preparing section 103, and a notifying section 104. The information management control section 101, when having received or being input with production information on image forming devices on a production line or a defect notice, registers the same with a database of the memory section 102 if this is production information.

The memory section 102 of this time has stored production information such as device IDs to identify image forming devices, the production data, the production line, information on various components used, and a person in charge of production or the like.

The information management control section 101, when having received a defect notice, based on the production date and production line of a component where a defect may occur and the details of a defect that may occur included in the defect notice, specifies an image forming device corresponding to the production information stored in the memory section 102.

Then, the information management control section 101 makes a request to the defect information preparing section 103 for preparation of defect information. The defect information preparing section 103, when having received a request for preparation of defect information from the information management control section 101, prepares defect information including the device ID of the image forming device specified by the information management control section 101 and the defect and importance notified in the defect notice.

The defect information preparing section 103 notifies the notifying section 104 of the prepared defect information.

Figure 3:
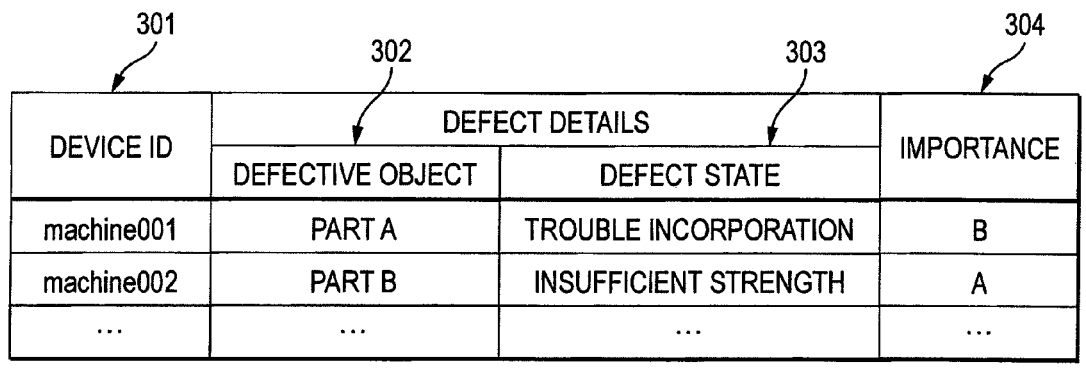
FIG. 3 is a table showing an example of defect information.

An example of the defect information of this time is shown in FIG. 3.

FIG. 3 consists of a [Device ID] item 301, a [Defective Object] item 302, a [Defect State] item 303, and an [Importance] item 304.

The [Device ID] item 301 shows a device ID to identify an image forming device where a defect may occur, the [Defective Object] item 302 and the [Defect State] item 303 show defect, and the [Importance] item 304 shows the importance for determining a measure to be performed based on a defect.

Moreover, the [Defective Object] item 302 shows a component where a defect may occur, and the [Defect State] item 303 shows the details of a defect that may occur or the cause of a defect.

For example, a record where the [Device ID] item 301 is "machine002," the [Defective Object] item 302 is "Part B," the [Defect State] item 303 is "Insufficient Strength," and the [Importance] item 304 is "A" indicates that the "Part B" of an image forming device identified by "machine002" is "insufficient in strength," and that the importance of a measure against this defect is highest "A."

Figure 4:
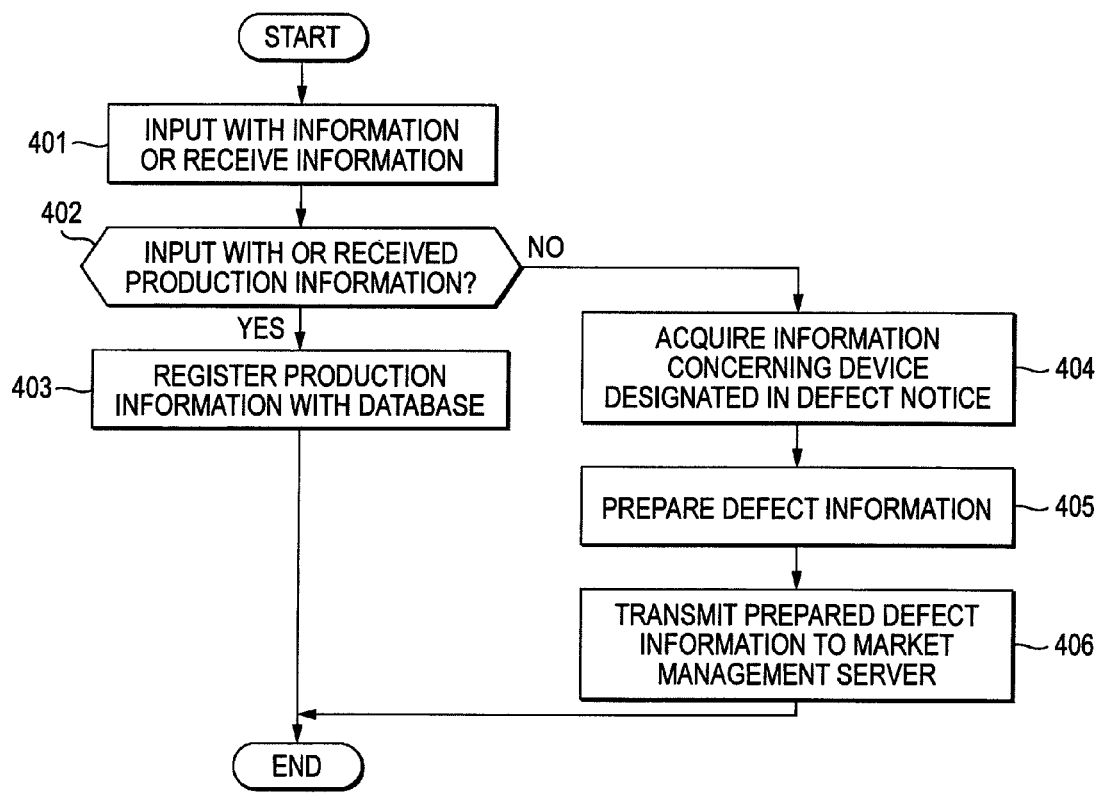
FIG. 4 is a flowchart showing a detailed flow of processing in the production server of the management system in the embodiment of the present invention.

FIG. 4 is a flowchart showing a detailed flow of processing in the production server of the management system in the embodiment of the present invention.

In FIG. 4, when the production server is input with or receives predetermined information (401), the production server then judges whether the input or received information is production information concerning an image forming device manufactured through a production line (402). If the information is production information on an image forming device in the production process (YES in 402), the production information is registered with a database (403).

In the database, production information in the production process of each image forming device, for example, the line number of a line where the image forming device has been manufactured, the person in charge of production, information on each component being used, is managed in correspondence with a device ID to identify the image forming device.

On the other hand, when no such production information but a defect notice indicating that a defect may occur is received for a manufactured image forming device (NO in 402), production information corresponding to the information on a defect designated in the defect notice is acquired from the database (404).

In the defect notice, an image forming device where a defect may occur has been designated by the production data, production line, etc., for example, and information concerning an image forming device corresponding to production information including such designation, for example, a device ID, is acquired from the database (404).

Then, defect information including the acquired device ID and the defect and importance is prepared (405). The defect information thus prepared is transmitted to the market management server (406).

Figure 5:
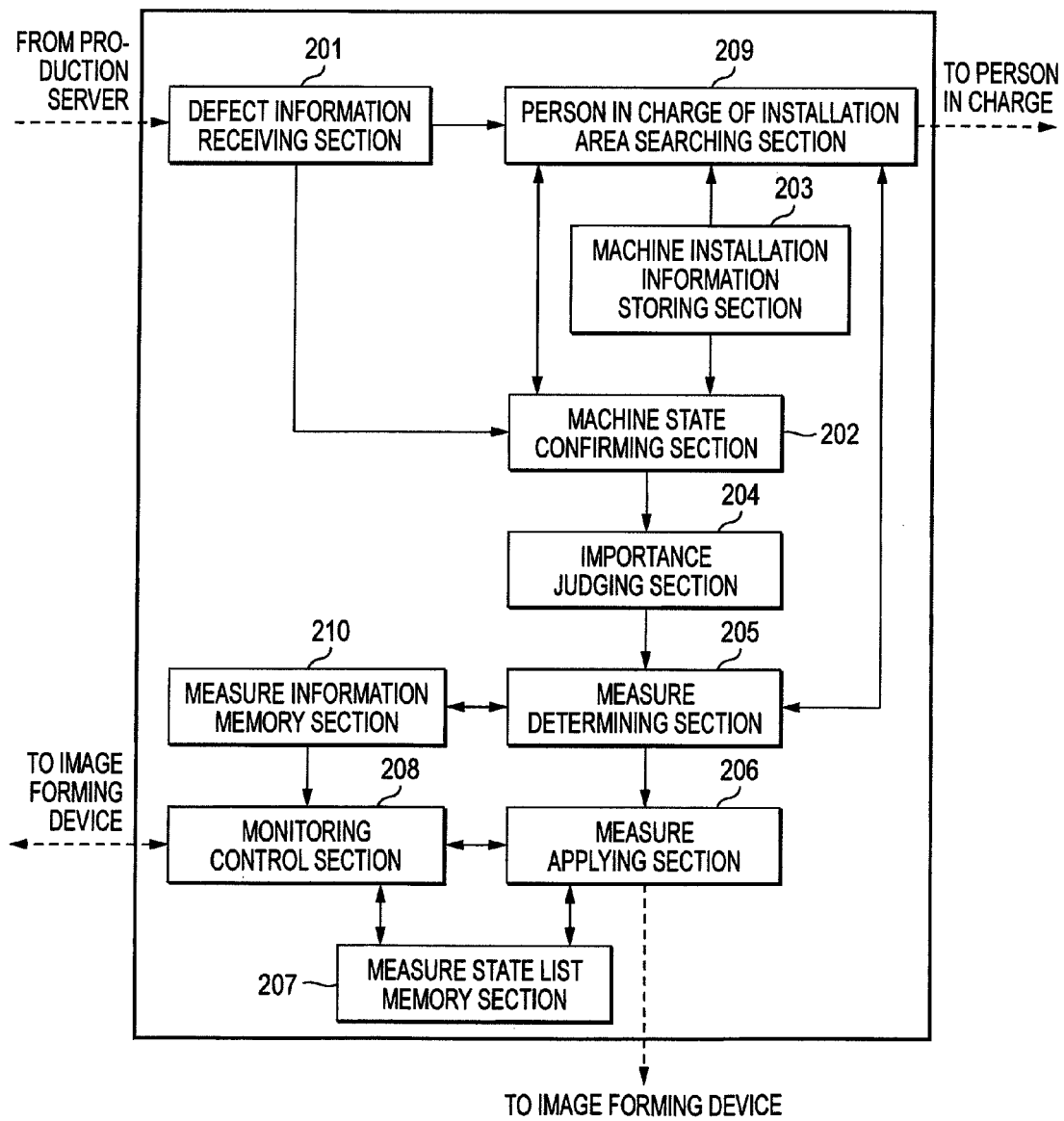
FIG. 5 is a diagram showing a detailed configuration of the market management server of the management system in the embodiment of the present invention.

FIG. 5 is a diagram showing a detailed configuration of the market management server 200 of the management system in the embodiment of the present invention.

In FIG. 5, the market management server 200 includes a defect information receiving section 201, a machine state confirming section 202, a machine installation information storing section 203, an importance judging section 204, a measure determining section 205, a measure applying section 206, a measure state list memory section 207, a monitoring control section 208, a person in charge of installation area searching section 209, and a measure information memory section 210.

The defect information receiving section 201 receives a device ID to identify an image forming device, the details of a defect that may occur, and furthermore defect information including the importance etc., from the production server, and sends out the received defect information to the machine state confirming section 202 and the person in charge of installation area searching section 209.

The machine state confirming section 202 receives defect information to thereby confirm the installation state, the communication state, etc., of an image forming device identified by a device ID included in the defect information. In the machine state confirming section 202, it is judged from installation information on each image forming device stored in the machine installation information storing section 203 whether the image forming device has been installed and is in a state where this can communicate, and a communication state is judged by querying each image forming device designated by the device ID based on the installation information.

For the query of this time, it is also possible to receive information concerning components of the image forming device.

The installation information to be stored in the machine installation information storing section 203 includes, for example, information whether having been installed in a market in the sales history of a sale to a client by a person in charge or the like as well as, in the case of having been installed, information (an IP address or the like) to be used for a communication with that image forming device. An example thereof is shown in FIG. 6.

Figure 6:
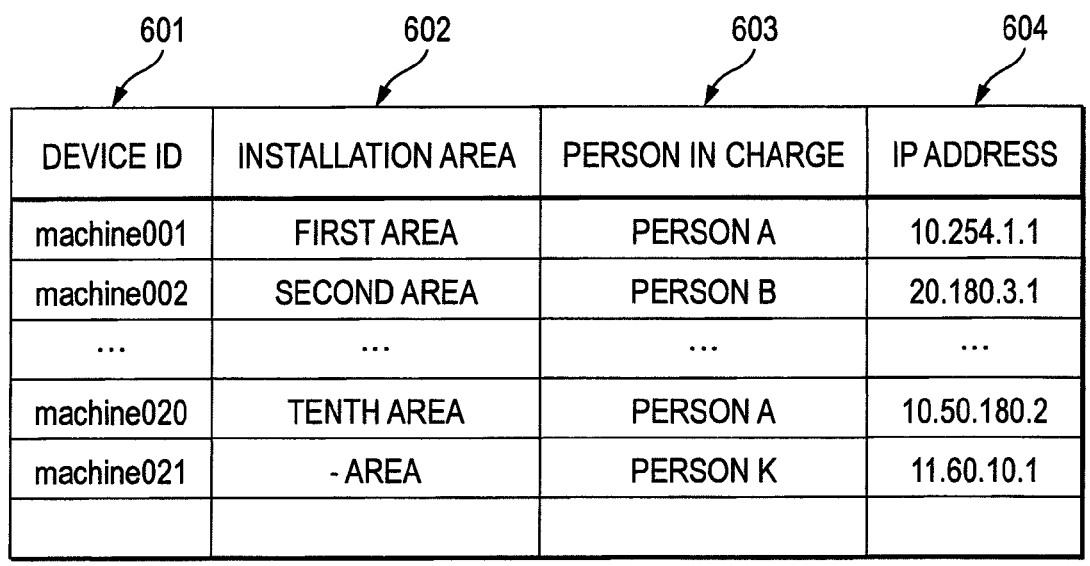
FIG. 6 is a table showing an example of installation information.

In FIG. 6, the installation information consists of a [Device ID] item 601, an [Installation Area] item 602, a [Person in Charge] item 603, and an [IP address] item 604.

The [Device ID] item 601 shows a device ID of an image forming device that has been installed in a market, and the [Device ID] item 601's showing a certain device ID means that an image forming device having the certain device ID has been installed in the market. More specifically, it is indicated that an image forming device a device ID of which has not been shown in the [Device ID] item 601 has not been installed in a market.

In addition, the [Installation Area] item 602 shows an installation area where the image forming device has been installed, the [Person in Charge] item 603 shows a person in charge of the installation area, and the [IP address] item 604 shows an IP address to perform communications with the image forming device.

For example, a record where the [Device ID] item 601 shows "machine001," the [Installation Area] item 602 shows "First area," the [Person in Charge] item 603 shows "Person A," and the [IP Address] item 604 shows "10.254.1.1" indicates that an image forming device having a device ID identified by "machine001" has been installed in the "First area" and the parson in charge of the first area is Person A. The record also indicates that the IP address to confirm a communication state is "10.254.1.1."

Such installation information is stored in the machine installation information storing section 203.

As a result of the installation state and the communication state of an image forming device being confirmed by the machine state confirming section 202, when the image forming device has been installed in a market and is in a state where this can communicate, a judgment as to the importance included in the defect information is then requested for the importance judging section 204.

The importance judging section 204 distinguishes the importance included in defect information. If, for example, five degrees of "A, B, C, D, E" are designated as the importance of this time, the importance judging section 204 distinguishes the importance as being any of the degrees from "A" of a highest degree of importance to "E" of a lowest degree of importance.

The judgment result is sent out to the measure determining section 205.

The measure determining section 205 determines whether to perform a measure for the image forming device based on the importance judged by the importance judging section 204, and if performing a measurement, determines the details of the measurement. This determination is performed using measure information (information to correlate defect with measure details) as shown in FIG. 7, which is stored in the measure information memory section 210

In FIG. 7, the measure information consists of a [Measure ID] item 701, a [Target Site] item 702, a [Defect State] item 703, a [Measure Details] item 704, and an [Importance] item 705. The [Measure ID] item 701 is information to identify a measure to be performed against defect, the [Target Site] item 702 shows a target site where a defect may occur, and the [Defect State] item 703 shows what details of a defect may occur.

The [Measure Details] item 704 shows the details of a measure to be applied to a defect that may occur, and the [Importance] item 705 shows information indicating the importance to determine a measure to be applied.

For example, a record where the [Measure ID] item 701 is "0001," the [Target Site] item 702 is "Part A," the [Defect State] item 703 is "Trouble incorporation," the [Measure Details] item 704 is "Suspend function a," and the [Importance] item 705 is "A" indicates that when it is in a state of "Trouble incorporation" for the "Part A" and the importance is "A," a measure of "Suspend function a" is performed.

When measure details are shown in the [Measure Details] item 704 as such, information concerning a measure based on the measure details is sent out to the measure applying section 206. On the other hand, in such case that no measure details are shown in the [Measure Details] item 704, a search request for the person in charge is made to the person in charge of installation area searching section 209 and a notice to that effect is made.

Such information is stored in the measure information memory section 210.

Further, the measure determining section 205, when the machine state confirming section 202 has acquired information on components from each image forming device, determines whether to perform a measure based on the information on components. For example, as the information on components, version information for each component has been designated, and it is determined whether to perform a measure according to the version.

The measure applying section 206 performs a measure for an image forming device based on the information sent out of the measure determining section 205. Examples of this measure to be performed include a measure of displaying arbitrary information on the display screen of the image forming device and a measure of performing a change etc., in a set value set for a setting item of the image forming device, besides a measure of stopping all functions of the image forming device and a measure of stopping some functions of the image forming device.

On the other hand, the person in charge of installation area searching section 209 searches for a person in charge of an area where the image forming device has been installed, and notifies the person in charge that a measure is necessary at some time although an early response is not necessary and of the details of the measure, etc.

When a measure is performed by the measure applying section 206, the state resulting from the measure applied to each image forming device is stored in the measure state list memory section 207. Further, the monitoring control section 208 is instructed to monitor the image informing device applied with the measure.

The measure state list memory section 207 stores what kind of measure has been applied to the identification information of the image forming device applied with the measure. The monitoring control section 208 monitors based on the information stored in the measure state list memory section 207 whether the measure state is continued until the image forming device has been restored or repaired.

When the measure is cancelled before the image forming device has been restored or repaired, the monitoring control section 208 makes a notice to that effect to the measure applying section 206, and the measure applying section 206 acquires the measure applied to the image forming device for which the measure has been cancelled from the measure state list memory section 207, and again applies the measurement.

FIG. 8 is a flowchart showing a detailed flow of processing in the market management server of the management system in the embodiment of the present invention.

The market management server starts processing upon receiving arbitrary information from the production server, and judges whether the received information is defect information (801). If having not received defect information (NO in 801), the market management server judges whether application of a measure has been completed to all target devices (811). If judged that application of a measure has been completed to all target devices (YES in 811), the market management server ends the processing.

On the other hand, if not judged that application of a measure has been completed to all target devices (NO in 811), the market management server registers information concerning a target device having not been applied with a measure (812), searches for a person in charge to make contact (813), and ends the processing.

Meanwhile, if having received defect information (YES in 801), the market management server confirms the installation state of an image forming device designated in that defect information (802).

This confirmation of the installation state means confirming whether the image forming device needs to be dealt with, by checking if the image forming device has been distributed to the market and used, or if the image forming device has, for example, been disposed of, if it is kept in storage and/or if it is in preparation of delivery.

Based on the confirmation, the market management server judges whether the device has been installed in a market (803), and if not installed in a market (NO in 803), ends processing. On the other hand, if installed in a market (YES in 803), the market management server requests for and receives information on components etc., of the image forming device from the target image forming device that has been installed (804).

The market management server judges whether having received the information on components etc., from all corresponding image forming devices (805), and if having not received information from all image forming devices (NO in 805), shifts to a standby state until having received it. Moreover, if having received information on components etc., from all image forming devices (YES in 805), the server distinguishes the importance included in the defect information (806).

Then, the market management server determines based on the information on components etc., received from the image forming device and the importance, whether it is necessary to perform a measure against a defect indicated by the defect information notified from the product server (807). For example, if replacement or repair of a component is necessary or measure details have been set for the importance, it is determined that a measure needs to be performed against the defect.

As a result of the determination, the market management server judges whether it is necessary to perform a measure (808), and if judged that it is necessary to perform a measure (YES in 808), acquires measure details corresponding to the defect designated as defect information from the measure details against defect stored in advance (809). In addition, if not judged that it is necessary to perform a measure (NO in 808), the server ends processing.

Then, the measure details are applied to the target image forming device (810).

The measure details include suspension of all functions of the image forming device, besides suspension of a predetermined function as mentioned in the above.

Meanwhile, if replacement or repair of the component has already been performed or no measure details have been set for the importance, it is determined that a measure needs not to be performed against the defect.

FIG. 9 is a flowchart showing a detailed flow of processing in the market management server of the management system in the embodiment of the present invention.

The market management server 200, when a measure is applied to an image forming device by a processing according to the flowchart as shown in FIG. 8, starts processing, and monitors whether the state with the measure being applied continues until the start of a defect restoring work (901).

When it is detected by monitoring that the measure has been cancelled (YES in 902), the measure details applied to the image forming device for which the measure has been cancelled are searched (903). Then, the searched measure details are again applied (904).

For example, all functions of an image forming device all functions of which have been suspended are again suspended when the image forming device starts operating due to a cause.

In the present invention, it is also possible to install, on a computer, a program to make a management system with a communication function execute the above-described operation or form the above-described unit from a recording medium (a CD-ROM, a DVD-ROM, or the like) that has stored the program and execute the program to thereby configure a management system for executing the above-described processing. The computer to form a management system is connected with a CPU (Central Processor Unit), a ROM (Read-Only Memory), a RAM (Random-Access Memory), and a hard disk via a system bus. The CPU performs processing using the RAM as a working area in accordance with a program stored in the ROM or hard disk.

In addition, the medium to supply the program may be a communication medium (a medium, such as a communication line, a communication system, that carries a program temporarily or in a fluid manner). For example, the program may be posted on a bulletin board service (BBS) on a communications network so as to be distributed via a communication line.

The present invention is not limited to the example mentioned above and shown in the drawings, but can be carried out by appropriate modifications within the scope not deviating from the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
   a managing unit that manages production information corresponding to each of a plurality of information processing devices;
   a specifying unit that specifies, based on a defect notice for at least one component and the production information on the information processing devices managed by the managing unit, at least one of the information processing devices using the at least one component;
   a state judging unit that judges whether each of the at least one of the information processing devices is in an operable state where a processing function of each of the at least one of the information processing devices is operable in an environment in which the processing function of each of the at least one of the information processing devices is provided; and
   an operation restricting unit that performs operation restriction for the processing function of each of the at least one of the information processing devices according to the defect notice in response to the state judging unit judging that each of the at least one of information processing devices is in the operable state.

2. The management apparatus according to claim 1, wherein the state judging unit judges whether the at least one component indicated by the defect notice is mounted on each of the at least one of the information processing devices by querying as to whether each of the at least one of the information processing devices is mounted with the at least one component.

3. The management apparatus according to claim 1, wherein the operation restricting unit stops a part of the processing function of each of the at least one of the information processing devices which uses the at least one component indicated by the defect notice.

4. The management apparatus according to claim 2, wherein the operation restricting unit stops a part of the processing function of each of the at least one of the information processing devices which uses the at least one component indicated by the defect notice.

5. The management apparatus according to claim 1, the management apparatus further comprising:
   a monitoring unit that monitors the at least one of the information processing devices for which the operation restricting unit performs the operation restriction,
   wherein if it is in response to detecting, based on the monitoring by the monitoring unit, that the operation restriction has been canceled, the operation restricting unit again performs operation restriction the processing function of each of the at least one of the information processing devices.

6. The management apparatus according to claim 2, the management apparatus further comprising:
   a monitoring unit that monitors the at least one of the information processing devices for which the operation restricting unit performs the operation restriction,
   wherein in response to detecting, based on the monitoring by the monitoring unit, that the operation restriction has been canceled, the operation restricting unit again performs operation restriction the processing function of each of the at least one of the information processing devices.

7. The management apparatus according to claim 3, the management apparatus further comprising:
   a monitoring unit that monitors the at least one of the information processing devices for which the operation restricting unit performs the operation restriction,
   wherein in response to detecting, based on the monitoring by the monitoring unit, that the operation restriction has been canceled, the operation restricting unit again performs operation restriction the processing function of each of the at least one of the information processing devices.

8. The management apparatus according to claim 4, the management apparatus further comprising;
   a monitoring unit that monitors the at least one of the information processing devices for which the operation restricting unit performs the operation restriction,
   wherein in response to detecting, based on the monitoring by the monitoring unit, that the operation restriction has been canceled, the operation restricting unit again performs operation restriction the processing function of each of the at least one of the information processing devices.

9. A management system comprising:
   a plurality of information processing devices; and
   a management apparatus that includes:
      a managing unit that manages production information corresponding to each of the plurality of information processing devices;
      a specifying unit that specifies, based on a defect notice for at least one component and the production information on the information processing devices managed by the managing unit, at least one of the information processing devices using the at least one component;
      a state judging unit that judges whether each of the at least one of the information processing devices is in an operable state where a processing function of each of the at least one of the information processing devices is operable in an environment in which the processing function of each of the at least one of the information processing devices is provided; and
      an operation restricting unit that performs operation restriction for the processing function of each of the at least one of the information processing devices according to the defect notice in response to the state judging unit judging that each of the at least one of information processing devices is in the operable state.

10. A management method comprising:
    managing production information corresponding to each of a plurality of information processing devices;
    specifying, based on a defect notice for the at least one component and the production information on the managed information processing devices, the at least one of the information processing devices using the at least one component;

judging, by using a processor, whether each of the at least one of the information processing devices is in a operable state where a processing function of each of the at least one of the information processing devices is operable in an environment in which the processing function of each of the at least one of the information processing devices is provided; and restricting that performs operation restriction for the processing function of each of the at least one of the information processing devices according to the defect notice in response to judging that each of the at least one of the information processing devices is in the operable state.

11. A non-transitory computer readable medium storing a program causing a computer to execute a management process, the management process comprising:

managing production information corresponding to each of a plurality of information processing devices;

specifying, based on a defect notice for the at least one component and the production information on the managed information processing devices, the at least one of the information processing devices using the at least one component;

judging whether each of the at least one of the information processing devices is in a operable state where a processing function of each of the at least one of the information processing devices is operable in an environment in which the processing function of each of the at least one of the information processing devices is provided; and restricting that performs operation restriction for the processing function of each of the at least one of the information processing devices according to the defect notice in response to judging that each of the at least one of the information processing devices is in the operable state.

* * * * *